(12) United States Patent
Lambrecht

(10) Patent No.: US 7,712,637 B2
(45) Date of Patent: May 11, 2010

(54) WINE EXTRACTION AND PRESERVATION DEVICE AND METHOD

(76) Inventor: Gregory Lambrecht, 220 Eliot St., Natick, MA (US) 01760

( * ) Notice: Subject to any disclaimer, the term of this patent is extended or adjusted under 35 U.S.C. 154(b) by 586 days.

(21) Appl. No.: 11/010,598

(22) Filed: Dec. 13, 2004

(65) Prior Publication Data

US 2005/0178801 A1 Aug. 18, 2005

Related U.S. Application Data

(60) Provisional application No. 60/528,565, filed on Dec. 11, 2003.

(51) Int. Cl.
*B67B 7/00* (2006.01)
(52) U.S. Cl. .......................... 222/400.7; 222/1; 222/81; 222/399; 141/4; 141/17; 141/319; 141/330
(58) Field of Classification Search ...................... 222/1, 222/81, 82, 399, 400.7; 141/4, 11, 67, 70, 141/329, 330, 319, 320, 14, 17
See application file for complete search history.

(56) References Cited

U.S. PATENT DOCUMENTS

| | | | |
|---|---|---|---|
| 718,163 A | 1/1903 | Sherrard | |
| 2,705,578 A * | 4/1955 | Burns | 141/17 |
| 3,200,994 A | 8/1965 | Levinson | |
| 3,883,043 A * | 5/1975 | Lane | 222/82 |
| 3,976,221 A * | 8/1976 | Martin et al. | 222/61 |
| 4,473,174 A | 9/1984 | Heuser | |
| 4,475,576 A | 10/1984 | Simon | |
| 4,595,121 A | 6/1986 | Schultz | |
| 4,674,662 A | 6/1987 | Bergstrom | |
| 4,691,482 A | 9/1987 | Foueres | |
| 4,706,847 A | 11/1987 | Sankey | |
| 4,856,680 A | 8/1989 | Sitton | |
| 4,932,561 A * | 6/1990 | Boxall | 222/54 |
| 4,976,894 A * | 12/1990 | Robinson | 261/64.1 |
| 4,982,879 A | 1/1991 | Corrado | |
| 4,984,711 A | 1/1991 | Ellis | |
| 5,031,799 A * | 7/1991 | Owen | 222/131 |
| 5,139,179 A | 8/1992 | Cecil | |
| 5,395,012 A | 3/1995 | Grill | |
| 6,607,100 B2 * | 8/2003 | Phelps et al. | 222/152 |

* cited by examiner

*Primary Examiner*—J. Casimer Jacyna
(74) *Attorney, Agent, or Firm*—Sean Kavanaugh, Esq.

(57) ABSTRACT

Devices and methods are disclosed for extracting fluids from within a container sealed by a cork or septum without removal of the cork or septum or the contamination of the fluid 1.within the container by reactive gases or liquids. Embodiments of the device can include a needle connected to a valve which is in turn connected to a source of pressurized gas for displacing the fluid. Further embodiments of the device can comprise additional components that act to force the needle to be inserted through the cork or septum along a linear path, to aid in preventing buckling of the needle, to clamp the device to the container, to prevent expulsion of the cork or septum from the container, and to guide the needle through a specified region of the cork or septum. Various valves, pressure regulators, pressure ranges, needle geometries, gas selections are also presented. This device is particularly suited for the dispensing and preservation of wine.

6 Claims, 14 Drawing Sheets

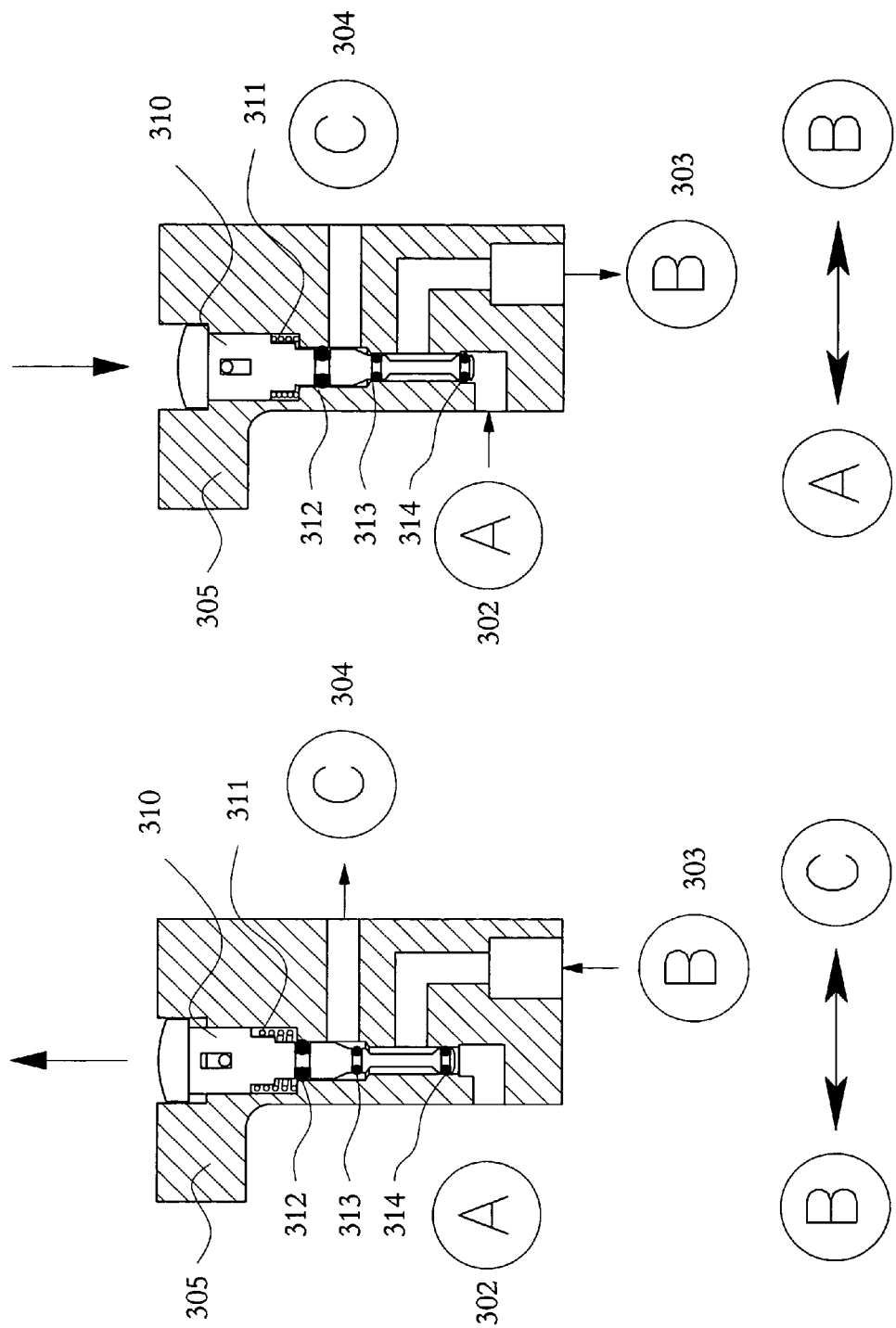

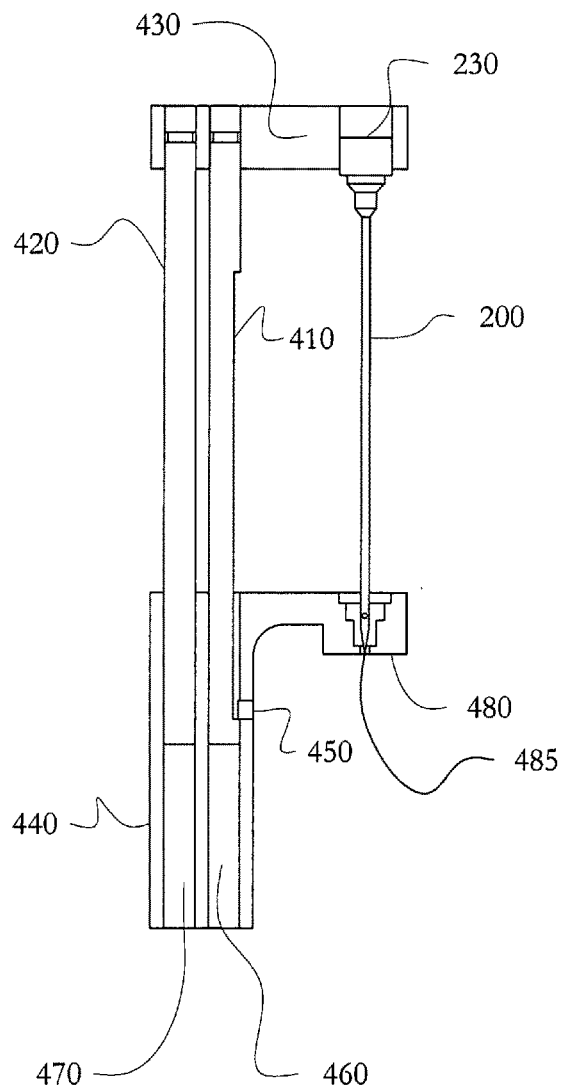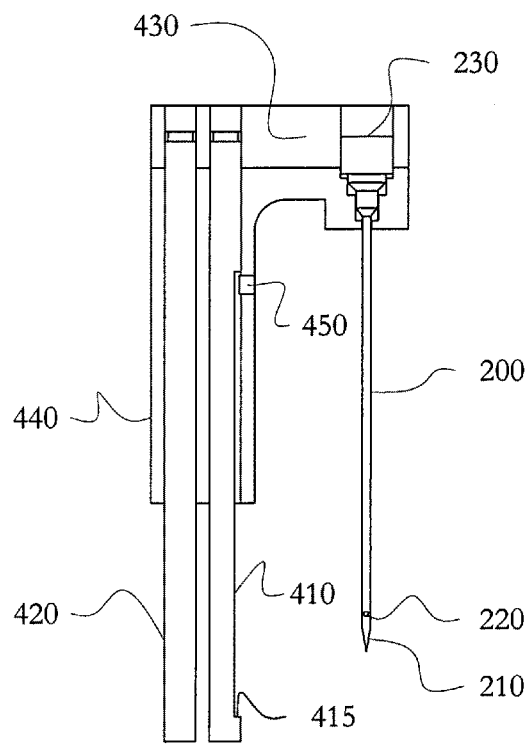
Figure 2D
Figure 2E

WINE EXTRACTION AND PRESERVATION DEVICE AND METHOD

RELATED APPLICATIONS

This application claims the benefit of U.S. Provisional Application No. 60/528,565 filed Dec. 11, 2003, the entire teachings of this application being incorporated herein by reference.

BACKGROUND OF THE INVENTION

Field of Invention

This invention relates generally to the dispensing or extracting of fluids from within containers and finds particular utility in the dispensing and preservation of wine.

SUMMARY OF THE INVENTION

The field of the invention includes devices and methods for extracting fluids from within containers.

An object of one or more embodiments of the invention is to allow a user to withdraw a volume of liquid from within a container that is sealed by a cork, plug or elastomeric septum without removing the cork, septum or closure device. It is a further object of one or more embodiments of the invention to allow removal of liquid from such a container repeatedly without causing enough damage to the cork that either gas or fluid exchange through the cork is possible under standard storage conditions. It is a further object of one or more embodiments of the invention to ensure that no gas which is reactive with the liquid passes into the container either during or after extraction of fluid from within the container.

Various embodiments of the invention enables the user to withdraw wine from within a wine bottle without removal of, or damage to the cork that would allow undesired gaseous or liquid egress or ingress during or after extraction of wine.

One embodiment of the invention involves a needle, a valve, and a source of pressurized gas. The needle is connected to the valve which is in turn connected to the source of pressurized gas. The needle is passed through the cork or between the cork and an interior wall of the bottle until it makes contact, at a minimum, with the interior of the bottle beyond the cork. Prior to or following insertion of the needle, the bottle is positioned such that the liquid content of the bottle can contact at least a portion of the needle. The valve is then opened such that pressurized gas can pass through the needle into the interior of the bottle. The valve is then switched to a position preventing further ingress of gas while allowing the liquid contents of the bottle to be expelled from the bottle through the needle by the pressurized gas now within the bottle. Once a desired amount of liquid content has been removed from the bottle, the bottle is then repositioned such that the pressurized gas content of the bottle is in contact with at least a portion of the needle so that the gas may be expelled from the bottle until there is no or an acceptably low pressure differential between the bottle and atmosphere. The needle is then removed from the cork.

In a preferred embodiment, the needle is a smooth exterior walled, cylindrical needle with a non-coring tip that can be passed through the cork without removing any material from the cork. The preferred non-coring tip is a pencil-tip that dilates a passageway through the cork, although deflected-tip and stylet needles have also been found to work and could be used in alternative embodiments. The pencil-tip needle preferably has at least one lumen extending along its length from at least one inlet on the end opposite the pencil-tip and at least one outlet proximal to the pencil-tip. The preferred outlet is through the side-wall of the needle.

With the correct needle gauge, it has been found that the passageway that remains following removal of such a needle self-seals against egress or ingress of fluids and gasses under normal storage conditions. While multiple needle gauges can work, preferred needle gauges range from 16 to 22 gauge, with the optimal needle gauge being between 17 and 20 gauge. These needles gauges offer optimal fluid flow with minimal pressures while doing an acceptably low level of damage to the cork even after repeated insertions and extractions.

Multiple needle lengths can be adapted to work within the scope of the present invention, however it has been found that a minimum needle length of 1.5 inches is required to pass through standard corks. Needles as long as 9 inches could be employed, but the optimal range of length has been found to be between 2 and 2.6 inches. The needle may be connected to the valve directly through any standard fitting (e.g. NPT, RPT, Leur, quick-connect or standard thread) or alternatively may be connected to the valve through an additional means such as a flexible or rigid tube.

While many standard valves could be employed, two are of particular utility for this application. The first is a three-way trumpet or spool valve. Such valves have a piston which slides within a cylinder. The piston is moved downward into the cylinder by the user depressing a button connected to or integral to the piston. The piston is moved upward by a return spring in contact with the piston. When the piston is depressed by the user, a first passageway through the cylinder allows passage of gas from a pressurized gas source connected to the valve at the "gas connection" into the needle connected to the valve at the "needle connection". Gas is allowed to enter the bottle through the needle until the user decides to release the piston. When the piston is released by the user, the spring pushes the cylinder upward exposing a second passageway through the cylinder which allows passage of the pressurized content in connection with the needle to pass through the cylinder to a "valve exit". This valve exit may, for example be a simple hole positioned above a glass or may be a tube leading to a secondary container. This process may be repeated until a desired amount of liquid is removed from the bottle. The user then positions the bottle such that pressurized gas within the bottle is in contact with at least one outlet of the needle. With the valve cylinder released, pressurized gas can then vent from the bottle through the needle connection and out of the valve exit until a desired final pressure is reached. The needle is then removed from the cork.

The second advantageous valve is an automatic, pressure regulated valve. The primary function of this valve is to maximize the rate of liquid content egress through the needle by automatically maintaining an optimal pressure range within the bottle. A secondary function of such a valve is to control the final pressure within the bottle just prior to removal of the needle from the cork. Such a valve could be operated by a user through the use of a toggle between two valve positions—extract and vent. In the extract position a passage between the pressurized gas source and the needle would be opened by the valve until a desired maximum pressure limit is achieved within the bottle. The valve would then automatically switch to the vent position wherein a passageway is opened between the needle and a valve exit so that contents of the bottle can be expelled. The valve would then automatically switch back to the extract position when a lower pressure limit was reached. This process continues until a desired amount of the liquid content of the bottle is extracted. The bottle is then positioned such that the gaseous contents of the bottle are in contact with at least a portion of the needle allowing gas to exit in the vent position prior to extraction of the needle. The lower pressure limit could be changed for this gas-venting procedure to allow a final/controlled pressure within the bottle. This changing of the lower pressure limit could be achieved automatically through the use of a switch that is activated by the tilting of the bottle (e.g. when the bottle is standing upward the switch would be activate the lower pressure while when the bottle is on its side the switch would activate the higher pressure.)

Other valves that could be used include, but are not limited to ball, solenoid, pivoted-armature, rotating cylinder, and toggle valves. Additional valves could further be added to the system. For example, a simple two-way check valve placed at the wine exit could be employed to maintain pressure within the bottle without flow of wine. In this way, wine can be released from the bottle at the users discretion after pressurization.

It has been found that the maximum value for the upper pressure limit is between around 40 and 50 PSI but is optimally between around 15 and 30 PSI. These pressures are well tolerated by even the weakest of cork-to-bottle seals. The lower pressure limit during wine extraction could be between 1 and 20 PSI lower than the upper pressure limit. For example, selecting an upper pressure limit of 30 PSI, it has been found that a lower limit of 15-20 PSI maintains an adequate pressure gradient to ensure rapid expulsion of wine through a 17 to 20 gauge needle. The final/controlled pressure (the lower of the lower pressure limits) can be between 0 and 15 PSI, with an optimal range of 0 to 5 PSI.

The source of pressurized gas can be any of a variety of regulated or unregulated pressurized gas containers filled with a variety of non-reactive gasses. In a preferred embodiment, the source consists of a container of gas with the gas at an elevated initial pressure (2000-3000 psi). This container is then regulated to the desired outlet pressure by either a fixed or variable regulator. This regulator can be any of a variety of single or two stage regulators available on the market. This configuration allows the use of conveniently small bottles of compressed gas that contain relatively large quantities of gas capable of emptying many bottles of wine. It further insures that the outlet pressure of the valve is maintained as the pressure within the container of gas changes during use. Multiple gasses have been tested successfully over extended periods of time, but the preferred gasses are nitrogen and argon. Preferably the gas is non-reactive with the fluid within the subject vessel such as wine and can otherwise protect the fluid from the deleterious effect of air infiltration or exposure. Nitrogen has the advantage of being very inexpensive and readily available in a variety of container sizes and initial pressures. Argon has the advantage of being a completely inert, noble gas as well as being heavier-than-air. By being heavier-than-air, argon minimizes the risk of inadvertent ingress of reactive atmospheric gasses during the final venting of the pressurized gas from within the container. Other non or minimally reactive gases or mixtures thereof also work, for example helium and neon. Preferably, the gas used should be equal to or greater in weight than air to prevent ingress of unwanted gasses and should have a low permeability through cork and/or glass, all resulting in helium being less preferred. Mixtures of gas are also possible. For example, a mixture of argon and another lighter gas would blanket the wine in argon while the lighter gas would occupy volume within the bottle and perhaps reduce the overall cost of the gas. Preferred embodiments use disposable membrane cylinders of nitrogen or argon at storage pressures equal to or greater than 2500 psi and a simple regulator set at a fixed outlet pressure between 15 and 30 PSI.

An alternative source of gas that allows greater volumes to be stored in smaller containers is a liquid that changes phase to gas and expands once released from its container.

In one exemplary embodiment a device is provided that has a hollow needle having an inlet at one end and an outlet at a second end and wherein the needle is adapted to penetrate beyond a closure device (such as a cork, plug, or septum) sealing a container; a pressurized source of gas; a pressure regulator capable of reducing the pressure of the gas from the pressurized source to a lower pressure at a regulator outlet, wherein the regulator is connected to the pressurized source at a regulator inlet; a valve secured at a first valve inlet to the regulator outlet, secured at a first valve outlet to the needle inlet, and having a second valve outlet for the passage of gas or fluids from within the container; and wherein the valve controls the flow of gas from the pressurized source into the container through the needle and the flow of gas or fluid from within the container through the needle and out of said valve outlet.

In one exemplary method fluid can be extracted from within a container sealed by a closure device by inserting the outlet of a single lumen, non-coring needle with a smooth exterior wall beyond the closure device and into the container; injecting a pressurized non-reactive gas into the container through the hollow needle thereby causing an increase of pressure within the container to a level higher than the surrounding atmospheric pressure; allowing the fluid within the container to be forced out of the container by this pressure through the needle until a desired amount of fluid is extracted; and then removing the needle from the closure device thereby allowing the closure device to reseal.

Other components can be added to the system to increase its functionality or durability. Of particular utility include a linear drive mechanism, a container attachment mechanism, a sealing member retention means, and an anti-buckling mechanism.

A linear drive mechanism is any mechanism that forces the needle to be inserted into and through the closure device or between the closure device and container in a linear path. This can help to prevent buckling of the needle due to side loads or bending moments. This system could be as simple as a single keyed rod passing through a matching keyed hole wherein the rod's travel through the hole is along a line co-linear with the desired needle path. This rod can be connected directly to the needle or to an intervening device. Further embodiments could include multiple cylindrical rods that pass through multiple closely matching round holes or tubes that are co-linear with the desired needle path, among others.

A container attachment mechanism is any mechanism capable of securing or stabilizing at least a portion of the device to the container. This can serve the purpose of again reducing the risk of buckling of the needle by ensuring that the needle path stays fixedly relative to the container. It can also aid in preventing inadvertent withdrawal of the needle from the container. It can further be used in concert with a cork or sealing member retention means to prevent expulsion of the sealing member from the container during pressurization. An attachment mechanism can provide an anchoring location that would give such a sealing member retention means the stability necessary to hold the sealing member in place during pressurization. For example, such a retention means could comprise a surface of the device that contacts a surface of a sealing member outside of the container and, when secured to the container by an attachment mechanism, could obstruct the path that the sealing member must travel to be expelled from the container. Suitable attachment mechanisms can include, but are not limited to, two clamping arms that close about a portion of the container. For example, in the case of a wine bottle, these two clamp arms could close about the neck of the bottle. An attachment mechanism could alternatively involve glue, Velcro, threaded attachments that are driven into a wall of the container, suction cups, tape, and the like. The attachment mechanism could additionally have a releasable lock that acts to releaseably secure the device to the container. In the case of the clamp arms, such a lock could include a simple threaded bolt that passes through both arms and has a nut on one end that can be threaded down the bolt to apply varying clamping force to the container and then be unthreaded to release the container.

An anti-buckling mechanism is any mechanism that acts to reduce the risk of the needle buckling during insertion and withdrawal of the needle. Apposing arms that contact the sides of the needle's length are one possible embodiment of such a mechanism. The arms could have a slot running through a surface of the arm. This slot could be as wide and deep as the needle diameter. As the needle is advanced into the sealing device, these slots would act to resist buckling of the needle by restraining bending of the needle due to contact between the needle length and the walls of the slot, giving the needle the opportunity to bend only toward the opening of the slot. Apposing arms could meet at an angle to create unlikely buckling paths offset by this angle. 90 degrees has been found to be a particularly effective angle. Other anti-buckling mechanisms are possible and include, but are not limited to, telescoping cylinders along the needle's length, a collapsible sleeve or bellows that supports the needle at various points along its length, a stiff coiled spring that contacts the needle along its inner diameter, or a single sliding cylinder that contacts the needle at the mid-point of the needle's exposed length outside of the sealing means during insertion and withdrawal.

Various exemplary embodiments of the device are further depicted and described below.

BRIEF DESCRIPTION OF THE DRAWINGS

FIG. 2B depicts the valve in its normal position which allows flow between the valve exit and the needle.

FIG. 2C depicts the valve in its activated position which allows flow between the needle and the regulator.

FIG. 2D depicts the linear drive mechanism attached to the needle with the linear drive mechanism at its upward most position.

FIG. 2E depicts the linear drive mechanism attached to the needle with the linear drive mechanism at its downward most position.

FIGS. 2A-G depict the use of the embodiment depicted in FIGS. 2 and 2A-E.

FIG. 5A shows a front view of a swing arm and indicates a swing arm slot which fits over a section of the needle length to resist buckling. FIG. 5B depicts two swing arms and their relationship to each of two swing arm axes and the needle.

DETAILED DESCRIPTION OF THE INVENTION

Figure 1:
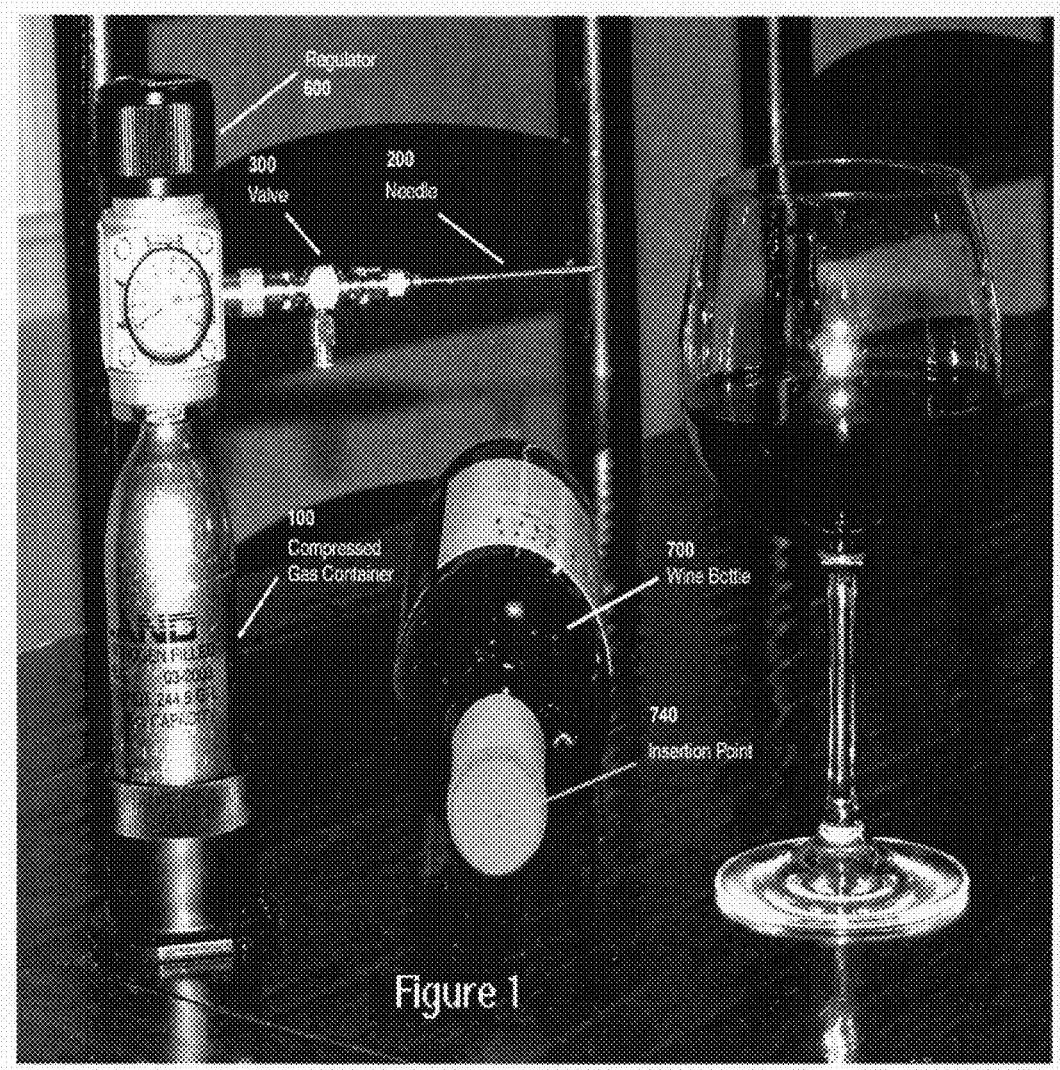
FIG. 1 depicts an embodiment comprising a pencil tip needle connected to a 3-way toggle valve which is in turn connected to a variable regulator connected to a compressed gas cylinder. A wine bottle that has been accessed by the device is also shown in the Figure. Note that the foil covering 742 the corked opening of the bottle is still intact and has not been removed but that a small central needle perforation at an insertion point 740 is shown.

An embodiment of the present invention is shown in FIG. 1. This system uses a pressurized source of gas 100 regulated by a variable regulator 600. The cylinder 100 is secured to the pressure regulator 600 by a simple threaded connection. This embodiment employs a 3-way toggle valve 300 allowing both extract and vent positions described above. This system also uses a pencil-tip non-coring needle 200 with a needle outlet along the side of the needle length near the needle tip. The connection between the valve 300 either the regulator 600 or needle is shown to be rigid. Alternatively these connections could be flexible if desired.

Additional components of a preferred embodiment of the present invention may include:

a bottle attachment or clamping mechanism securing the needle to the bottle, a linear needle drive system to facilitate insertion of the needle into the bottle along a linear path, a needle guide that allows insertion of the needle through a particular region of the cork, an anti-buckling means to minimize the risk of the needle buckling during insertion, a cork retention means that acts to prevent cork expulsion during pressurization, a bottle stand that facilitates holding and/or tilting of the bottle during the extraction and venting phases, a pressure meter that allows the user to know the pressure within the bottle and/or the exit pressure of the gas source, a needle protection means or lock preventing inadvertent injury of the user by the needle once it is withdrawn from the bottle.

Multiples of these components could be combined into single parts or components serving multiple functions. For example, the anti-buckling means could also serve as a needle protection means, the cork retention means and the needle guide could be combined into a single unit secured to the bottle at the exterior of the cork, and this needle guide/cork retainer could further be a part of the bottle clamping means that may be further combined with the linear needle drive.

Figure 2:
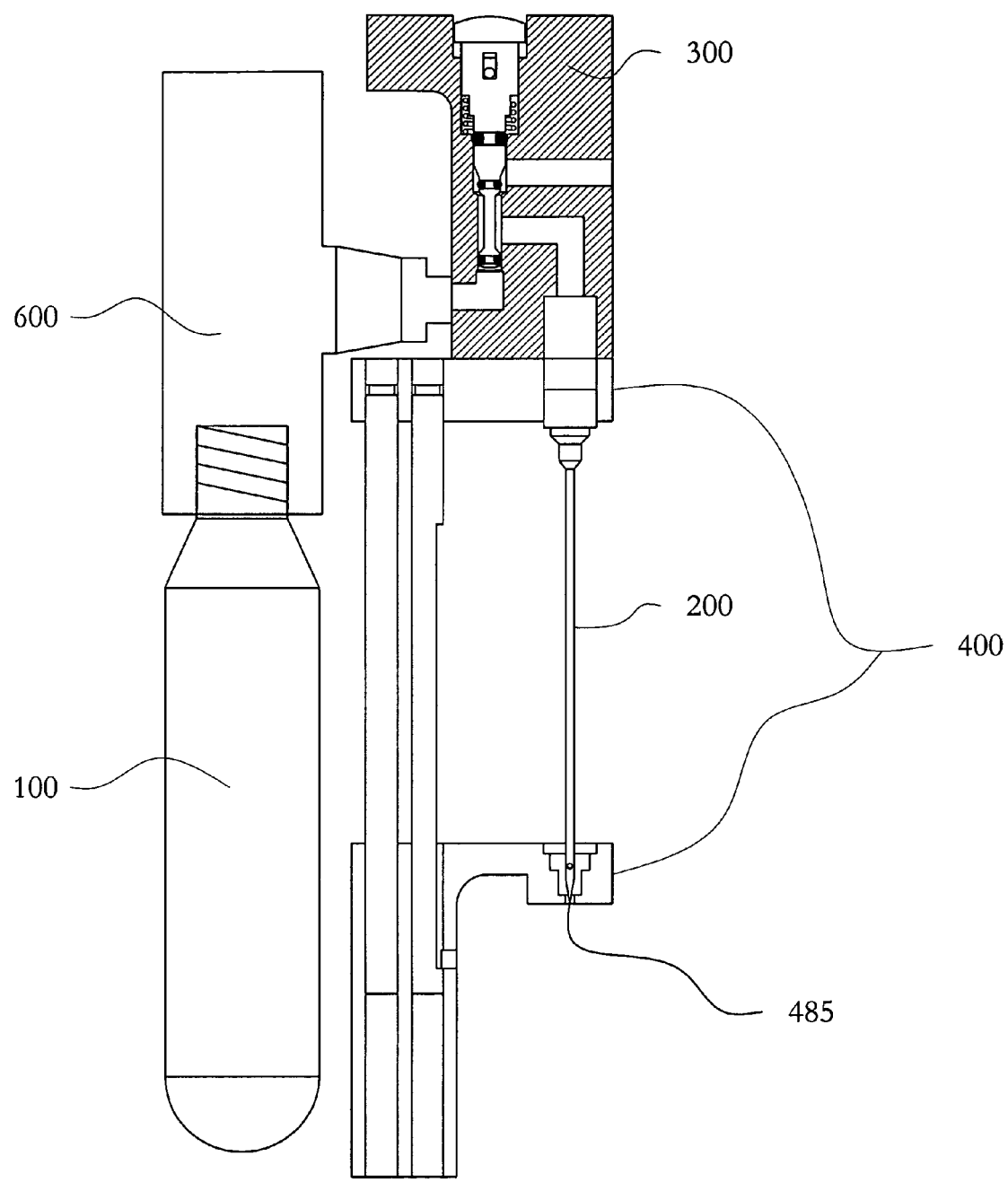
FIG. 2 depicts a cross section of a preferred embodiment of the present invention. The embodiment consists of a cylinder of compressed gas, a fixed pressure regulator, a valve, a needle, and a linear drive mechanism. Details of this embodiment and its use are depicted in FIGS. 2A-E and FIGS. 2A-G.

FIG. 2 depicts a cross section of a preferred embodiment of the present invention. The embodiment consists of a cylinder of gas 100 connected to a regulator 600 which is in turn connected to a valve 300. This valve 300 is then secured to a needle 200. The needle 200 and/or the valve 300 are secured to a linear drive mechanism 400. The pressure within cylinder 100 is preferably considerably higher than the outlet pressure of the regulator 600. Regulator 600 is shown without detail, but can be any of a variety of commercially available single or two stage pressure regulators capable of regulating gas pressures to a pre-set or variable outlet pressure. The connection of the various components is not depicted in detail, but can be achieved through either rigid (threaded, welded, taper lock etc.) means or flexible (tubing, o-ring seal, gasket seal) means. The length of such a connection can be varied depending upon the specifics of the desired application.

Figure 2A:
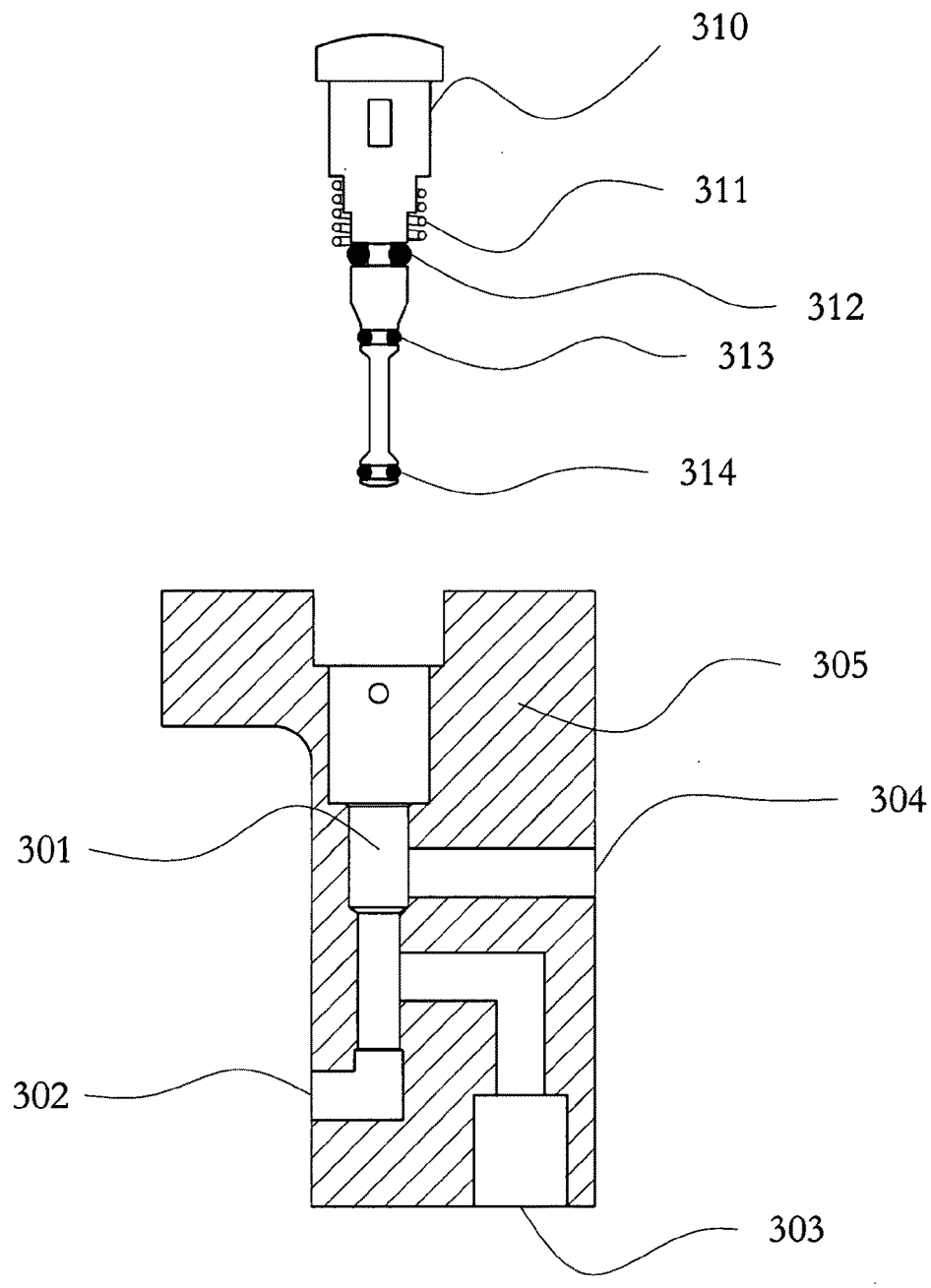
FIG. 2A is an exploded view of the three-way spool valve used in this embodiment.

FIGS. 2A-C detail a preferred embodiment of a three-way, spool valve 300 that has been found particularly useful to control the flow of wine and gas. The valve 300 consists of a piston 310 and a valve body 305. The piston 310 employs three o-rings—an upper 312, middle 313, and lower 314—to control the flow of fluids and gasses through the valve cylinder 301.

In FIG. 2B, the upper 312 and lower 314 o-rings are sealing against the inner walls of the valve cylinder 301, allowing flow between the needle attachment site 303 and the wine exit 304. In this position, flow between the gas entrance 302 and the other two ports is prevented by the lower o-ring 314. This is the normal state of the valve with the return spring 311 holding the cylinder in this position. This is the "vent" position described above which, for convenience, will be referred to as B-C.

In FIG. 2C, the upper 312 and middle 313 o-rings are sealing against the inner walls of the valve cylinder 301, allowing flow between the gas entrance 302 and the needle attachment site 303. Flow between the wine exit 304 and the other two ports is prevented by o-ring 313 in this position. This is the "extract" position described above which, for convenience, will be referred to as A-B. The user achieves this valve position by pushing down on piston 310 compressing the return spring 311. Once the user stops depressing the valve piston 310, the return spring 311 causes the piston to return to position B-C depicted in FIG. 2B.

FIGS. 2D and 2E detail an embodiment of a linear drive mechanism 400. In this embodiment, two cylindrical rods (front rod 410 and back rod 420) pass through two closely matching rod holes (front rod hole 460 and back rod hole 470). These two rods are securely attached to upper piece 430 which is also secured to needle 200. The offset of the two rods creates a resistance to angulations of or side loads on needle 200 by providing a resistive moment. This insures that the needle 200 can travel into and out of a cork only along a line co-linear with the rods.

A flat has further been cut onto the front surface of front rod 410. This flat acts in concert with rod stop 450 to restrict the upward travel of the needle 200 relative to the bottom piece 440 when stop surface 415 on front rod 410 engages rod stop 450. This method could also be used to limit downward travel of the needle 200 relative to bottom piece 440. FIG. 2D illustrates the needle 200 at full upward travel while FIG. 2E illustrates the needle 200 at full downward travel relative to bottom piece 440.

During use, the needle guide 480 and its through hole 485 are positioned above the cork of a wine bottle and are secured to or part of bottom piece 440. In this embodiment, the needle guide 480 could be used as a cork retainer if a bottle clamping mechanism is incorporated into bottom piece 440. Such a bottle clamping mechanism has been left out of this embodiment to detail the other components of the system, but could readily be added. Various embodiments of such a clamping mechanism are described below in alternate embodiments.

Figure 3A:
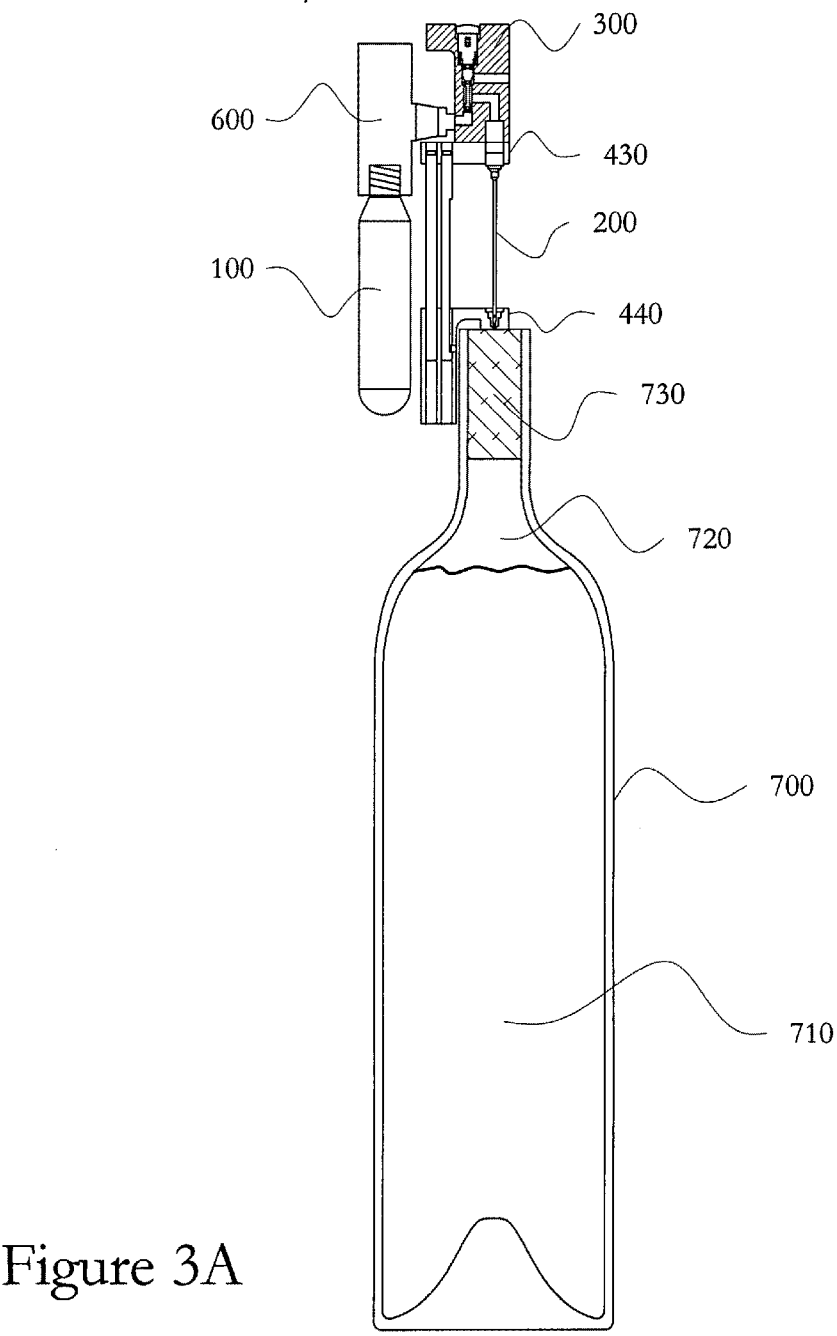
FIG. 3A depicts the embodiment positioned on the bottle with the needle positioned over the wine bottle cork and the linear drive mechanism at its upward most position.
Figure 3B:
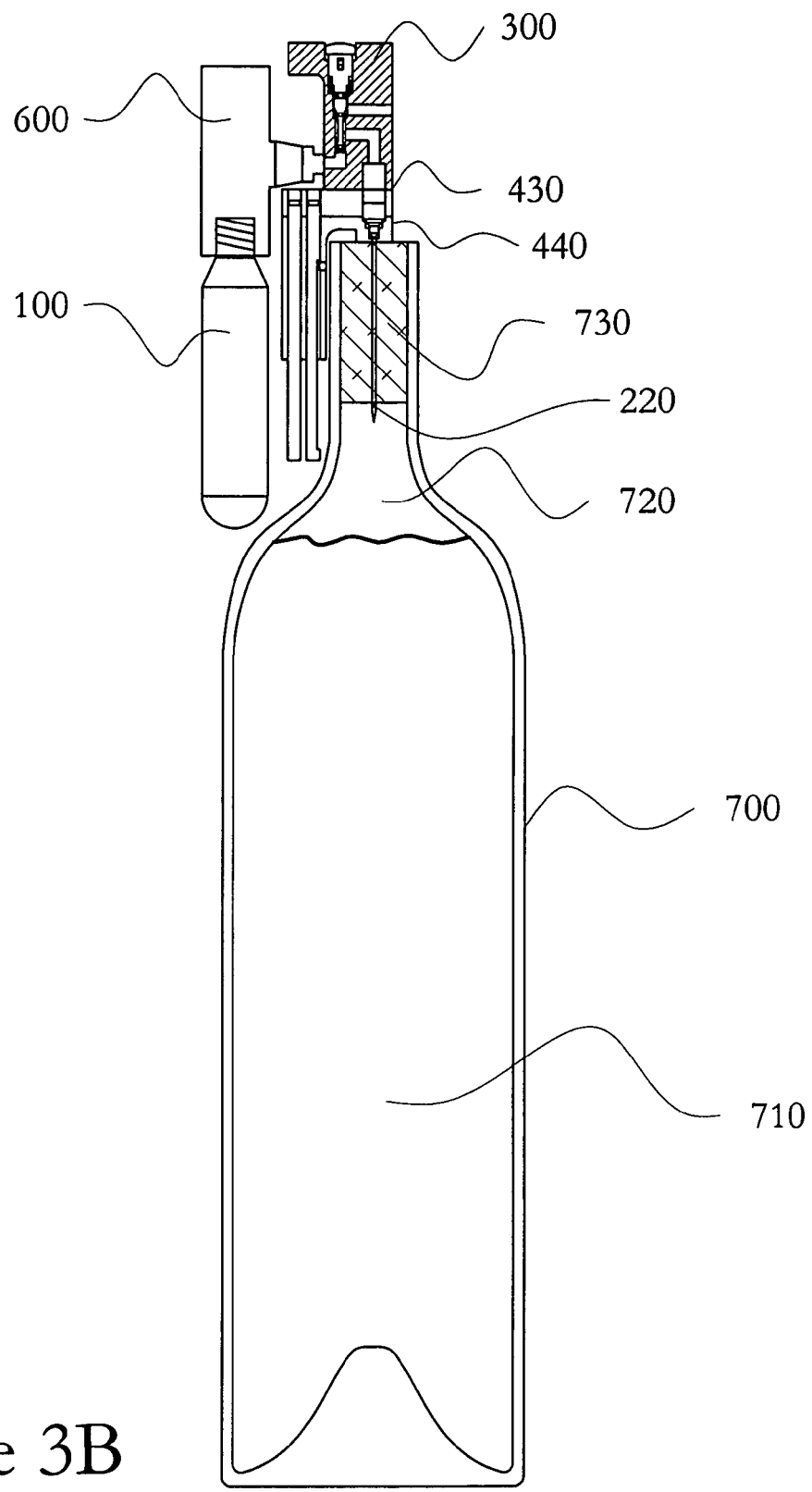
FIG. 3B depicts the linear drive mechanism at its downward most position with the needle tip driven through the cork and into the interior of the bottle.

FIGS. 3A-3G illustrate the use of the embodiment depicted in FIG. 2 and detailed in FIGS. 2A-E. In FIG. 3A, the bottom piece 440 has been placed on top of wine bottle 700 with the upper piece 430 at full upward travel. The valve is in its normal position B-C. The wine 710 and gas 720 within the bottle 700 are in their undisturbed state as bottled by the vintner. FIG. 3B depicts the needle outlet 220 beyond cork 730 and within bottle 700 with the upper piece 430 at full downward travel. This position is achieved by simply pushing downward on valve 300 or upper piece 430. The valve 300 is still in its normal B-C position.

Figure 3C:
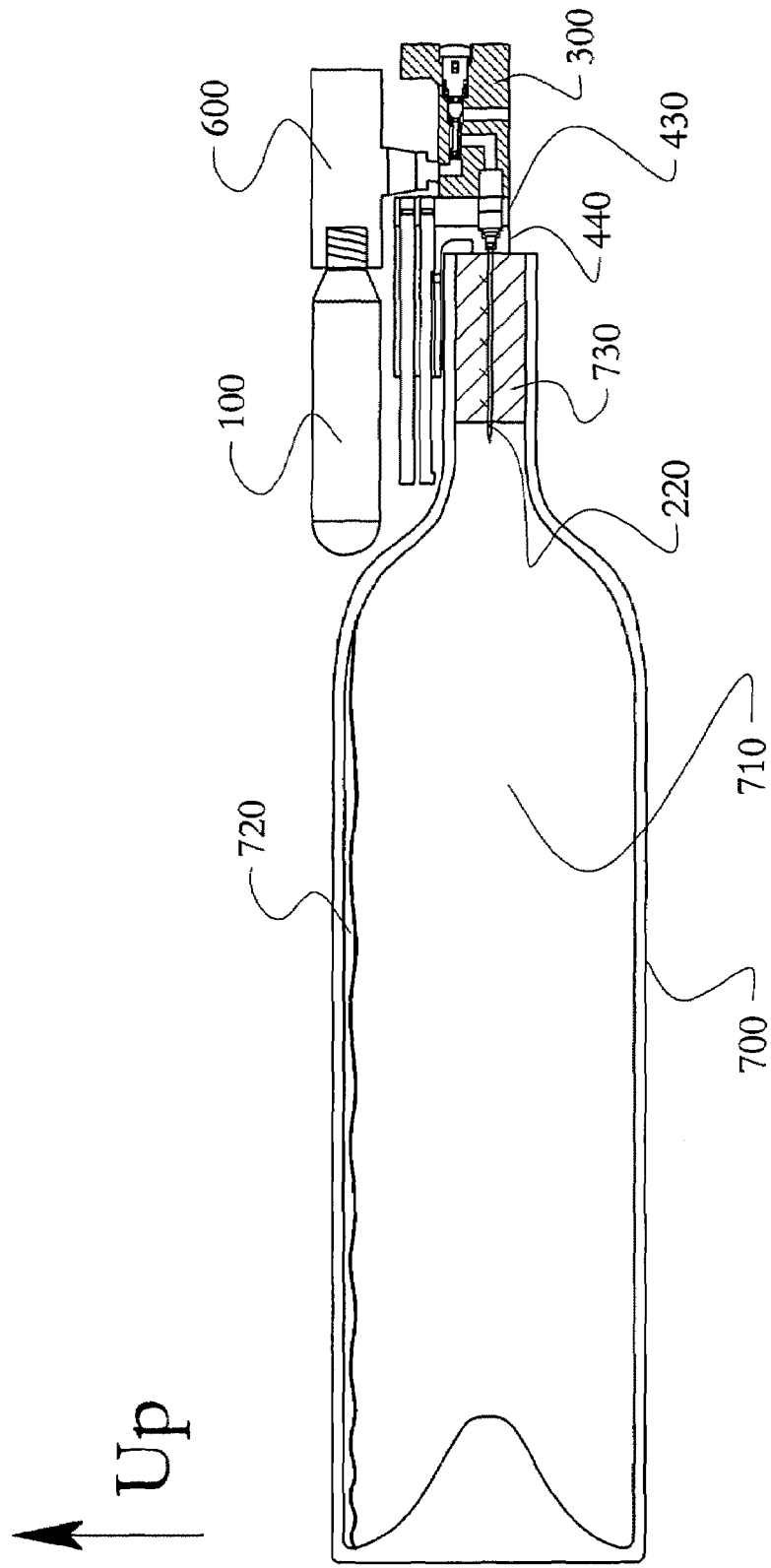
FIG. 3C depicts the system shown in 3B with the bottle tilted on its side causing the needle tip to come in contact with the liquid contents of the bottle.
Figure 3D:
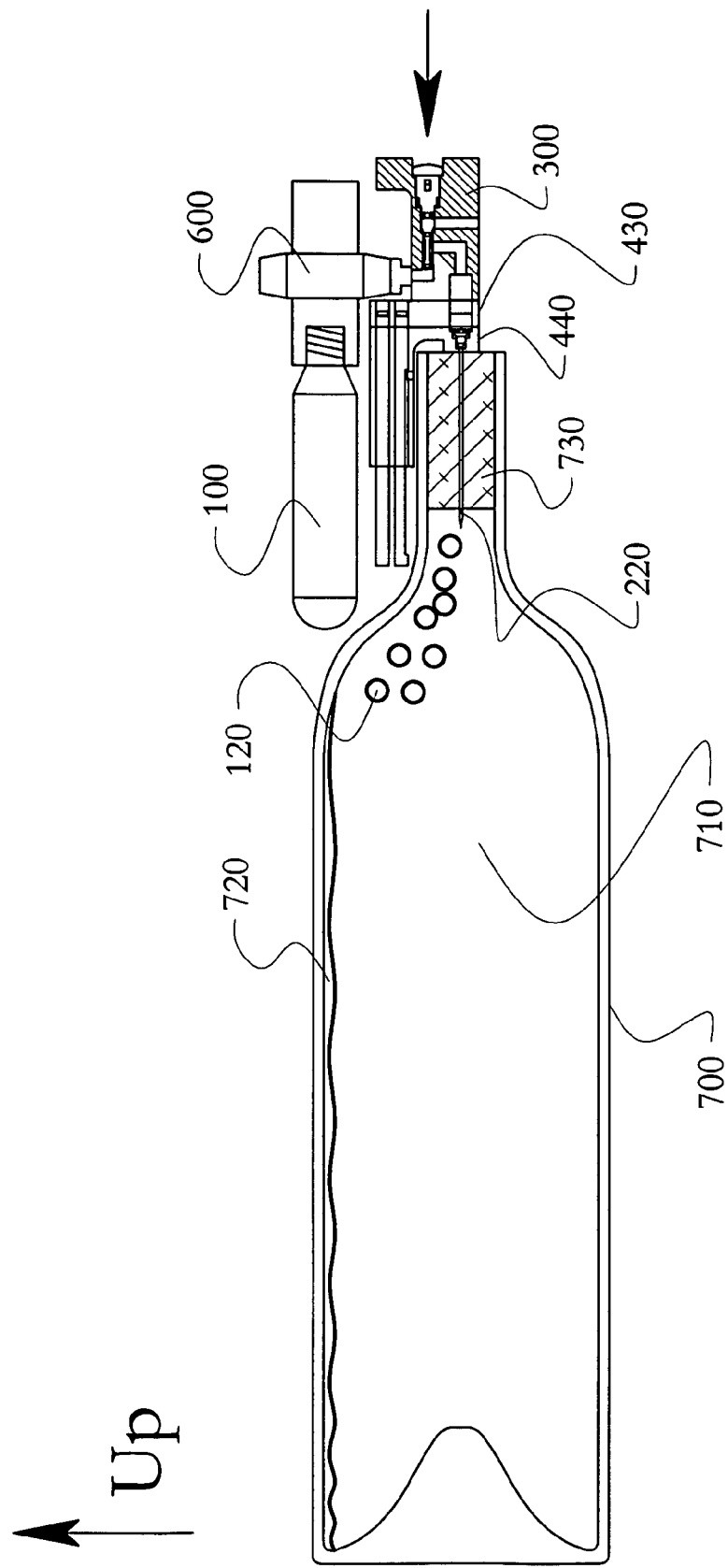
FIG. 3D depicts the system of 3C with the valve activated causing gas at a pressure regulated by the fixed regulator to enter the bottle through the needle, increasing the pressure within the bottle.
Figure 3E:
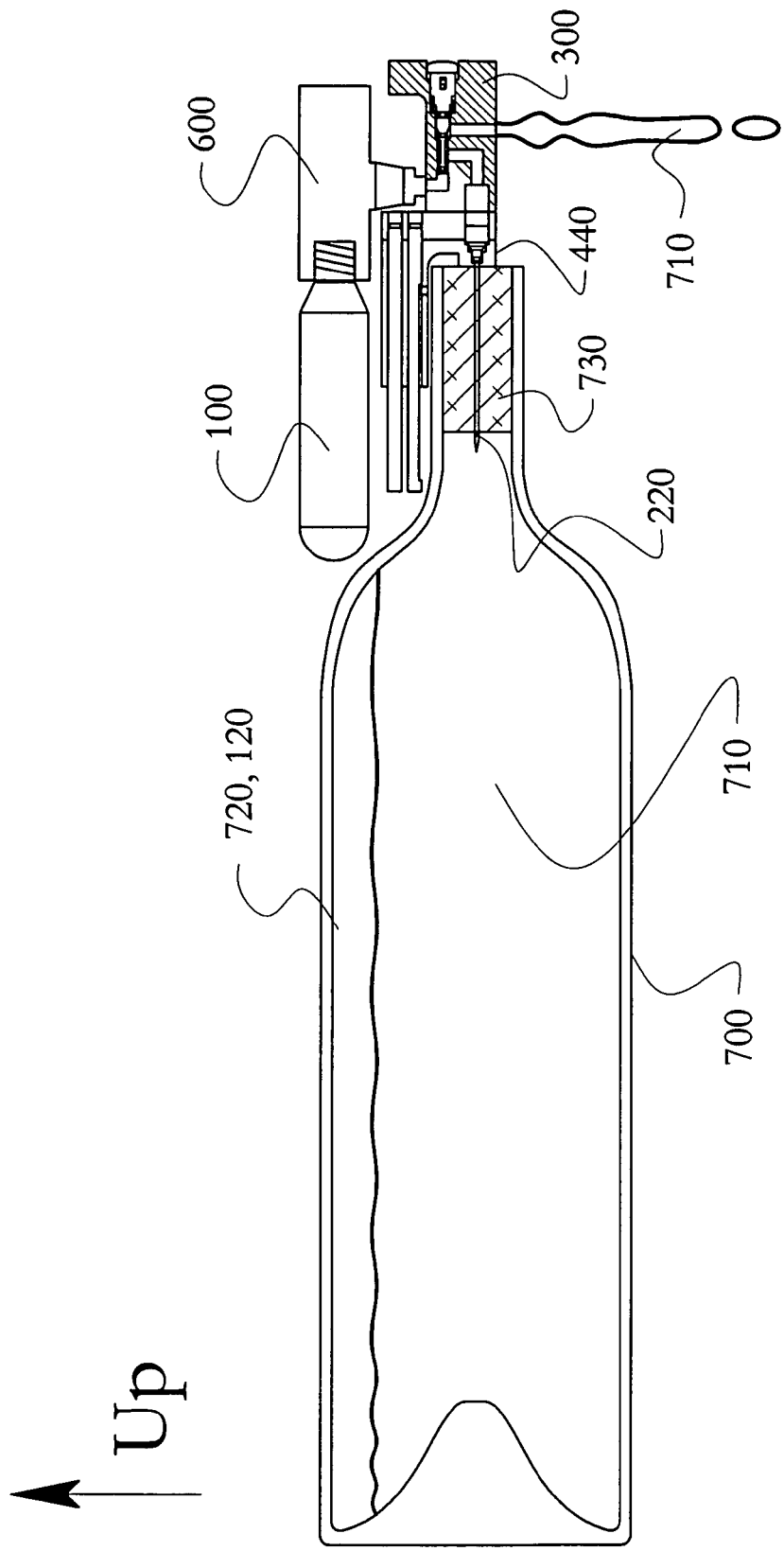
FIG. 3E depicts the system of 3D with the valve returned to its normal position, enabling the increased pressure within the bottle to drive wine through the needle and out of the valve exit.
Figure 3F:
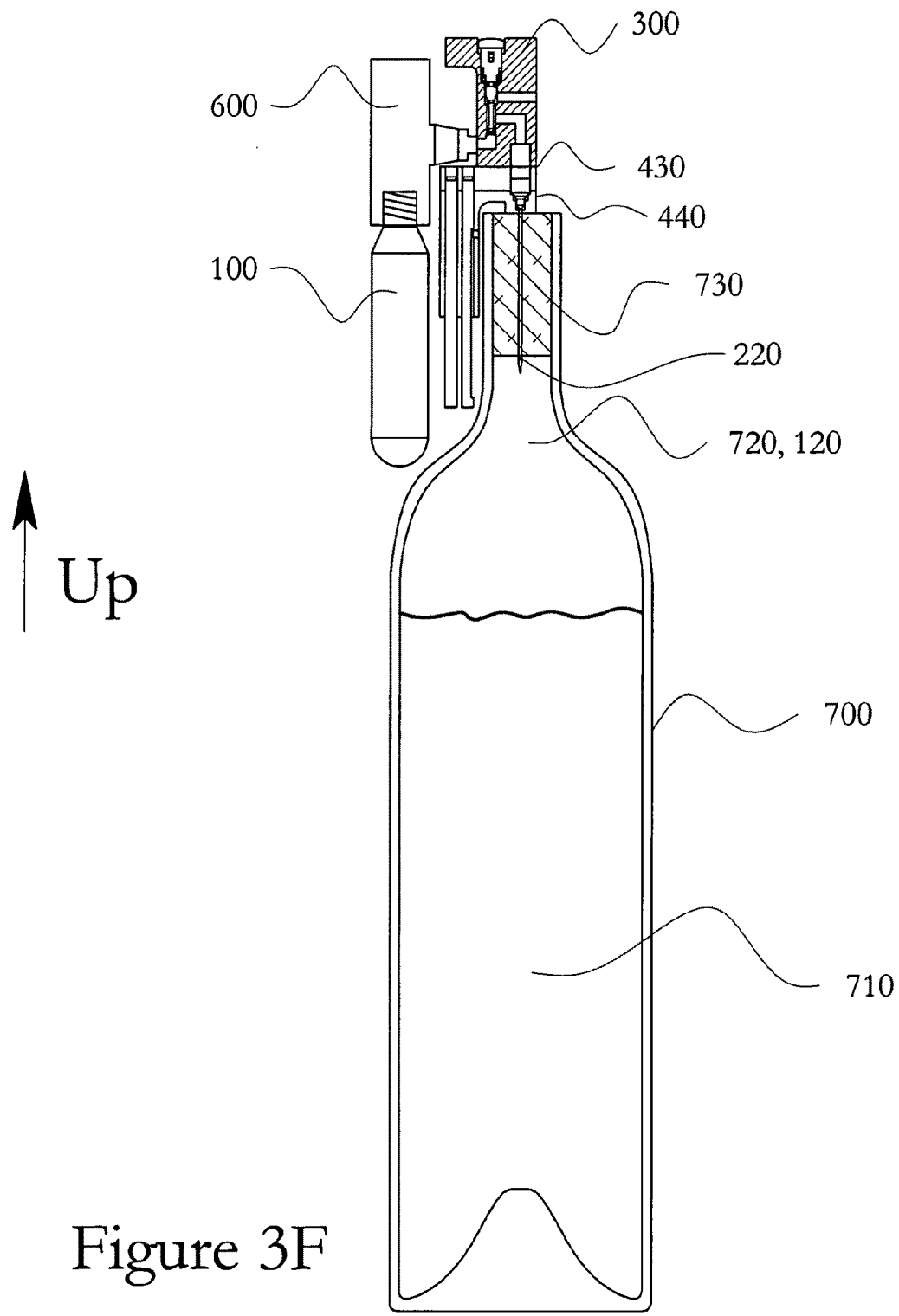
FIG. 3F depicts the bottle returned to an upright position allowing excess gas from within the bottle to contact the needle tip and vent through the valve exit until the pressure equilibrates with atmospheric pressure.
Figure 3G:
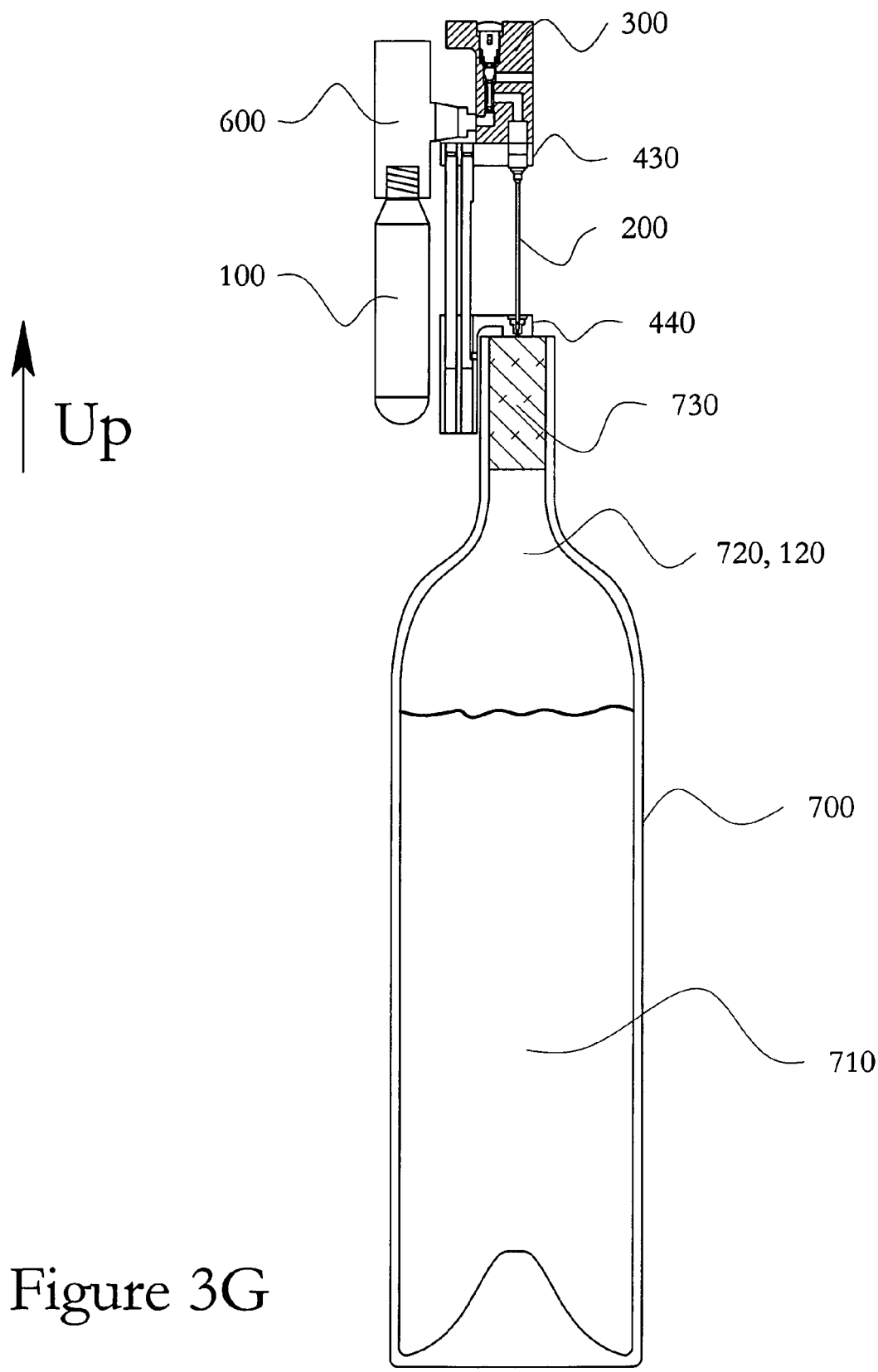
FIG. 3G depicts the system shown in FIG. 3F with the needle withdrawn from the bottle and the linear drive mechanism at its upward most position.

In FIG. 3C, the bottle has been tilted on its side, causing wine 710 to contact the needle outlet 220. In FIG. 3D, the valve has been moved by the user into its A-B position, allowing pressurized gas 120 from within cylinder 100 to pass through the regulator 600 at its upper pressure setting, through gas entrance 302, through needle attachment 303, out of needle outlet 220 into wine 710 within the bottle 700. This gas 120 increases the pressure within the bottle until it reaches equilibrium with the gas pressure determined by the regulator 600. In FIG. 3E, the valve 300 has been allowed to return to its normal state B-C, opening a path between the needle outlet 220 and the wine exit 304. The wine 710 is now driven by the elevated pressure of the gasses 720 and 120 within the bottle through the needle outlet 220 and out of valve 300. This flow will continue until pressure within the bottle equilibrates with atmospheric pressure if the user wishes. However, excess pressure can be allowed to vent by simply standing the bottle upright, as depicted in FIG. 3F. Once the bottle is upright, the gasses 720 and 120 within the bottle are in contact with the needle outlet 220 and can vent from valve 300 with the valve in its normal position B-C. Once the pressure has reached a desired level, the needle can be withdrawn from the cork 730 by pulling upward on the upper piece 430 or valve 300 until the upper piece reaches its upward most travel. The bottom piece 440 and the rest of the system can then be removed from bottle 700.

It has been found that corks accessed by such a system, particularly with a smooth walled exterior, pencil point or Huber point needle of 16 gauge or higher, seal effectively and prevent the ingress or egress of gases or fluids and can be stored in the same way as an un-accessed bottle for years without abnormal alteration of the wines flavor. Other needle profiles and gauges are also usable with the system.

In the above described embodiment, the needle guide through hole 485 is depicted over the center of the cork 730. Alternatively, the through hole 485 could be offset from the center of cork 730 to decrease the potential that multiple uses of the system will allow the needle to pass through the same site in the cork.

An alternative embodiment is depicted in FIGS. 4A-E. This embodiment employs an alternate linear drive system, a bottle clamping mechanism, a different configuration of 3-way spool or trumpet valve, and an anti-bucking mechanism.

Figure 4:
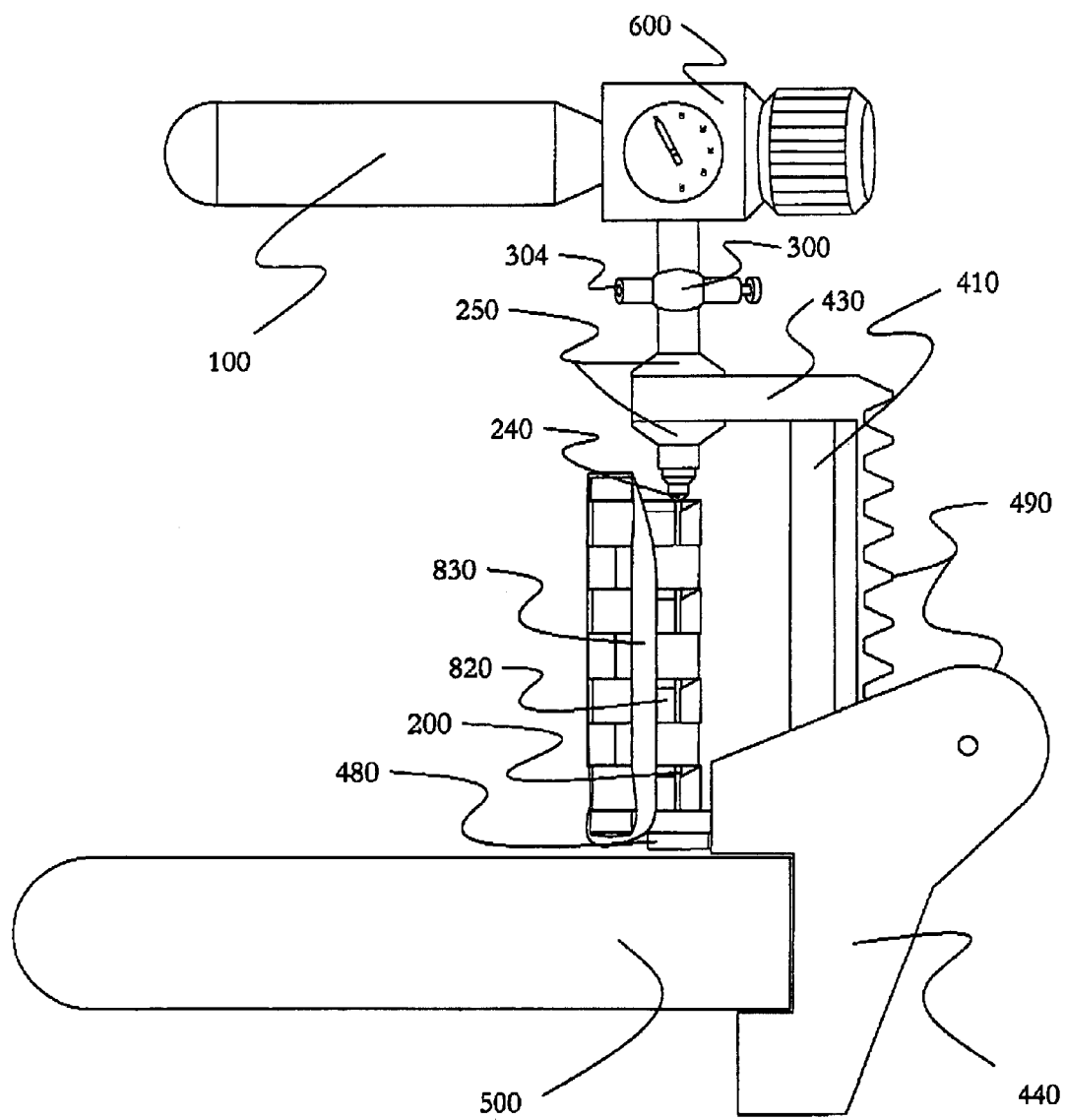
FIG. 4 is a side view of an alternative embodiment further comprising an anti-bockling mechanism that resists buckling of the needle as it is advanced into the bottle. It further employs a trumpet valve, a linear drive mechanism comprising a linear drive shaft and gear, and a container attachment or bottle clamping mechanism.

An alternative embodiment is depicted in FIG. 4. FIG. 4 illustrates a side view of this exemplary embodiment in a multi-component, assembled fashion. On the upper left the figure is a cylinder of compressed gas 100 attached to a regulator 600. Below the regulator 600 is a trumpet valve 300. Below the valve 300 are the needle 200, anti-buckling mechanism 800, linear drive mechanism 400, needle guide and cork retention means 480, and bottle clamp 500. The regulator 600 of this embodiment is a variable regulator. It has a simple threaded attachment to the compressed gas cylinder 100. The trumpet valve 300 is attached to the regular 600 through a simply Luer-style connector. The valve 300 is actuated by pressing the piston 310 shown in FIG. 4B. This valve 300 is a simple trumpet or spool valve. When the piston 310 is in the un-depressed position, the valve 300 is opened such that fluid can flow from the needle 200 and out of the valve exit 304 (position B-C or vent position). When the piston 310 is depressed gas can flow from the regulator 600 through the needle 200 (position A-B or extract position).

The linear drive mechanism 400 of this embodiment consists of a steel shaft or front rod 410 and gear 490 toward the bottom of the figure. The front rod 410 passes through a closely matching hole 460 in lower piece 440. Gear 490 is a rack and pinion system wherein when the circular gear turns, the gear teeth mesh causing the needle to be driven downward into the cork or upward out of the cork depending upon the rotational direction of the circular gear.

The clamp mechanism 500 and the anti-buckling mechanism 800. The anti-buckling system 800 comprises two steel rods and seven swing arms 820 pivoting about rods. Each swing arm has a proximal end with a through hole for the steel rod and a small slot cut at their opposite end which fits over the needle 200 along its length. Each steel rod acts as an axis about which the arms 820 swing. Each arm's slot opposes the neighboring arm's slot. These opposite facing slots act to entrap the needle 200 and prevent it from buckling along 270 degrees of the circumference of the needle at any one arm 820. Because the slots oppose each other, it is highly unlikely that the needle 200 can buckle along a length greater than the length of any individual slot. Even along one slot, the needle 200 can only buckle in the direction that the slot is open, eliminating the risk of buckling along 270 degrees of the needle circumference. These axes are spaced from each other such that alternate swing arms meet an angle. A particularly preferred angle of intersection of the swing arms is 90 degrees, but a range between 45 and 135 are also acceptable. By alternating the swing arms 820 in this fashion the needle slot of each swing arm 820 has an opening that is offset by roughly 90 degrees from its neighboring swing arm 820. This radically reduces the risk of needle 200 buckling as the ability to buckle in any single plane is eliminated. The needle 200 can only buckle along any one length supported by any one swing arm 820 in the direction that the needle slot is open. As the tendency to buckle is strongly dependent upon the free length available to buckle, the risk of buckling is exponentially lower than an unprotected needle. A particularly useful swing arm slot length has been found to be less than 0.5 inches for needles within the preferred gauge range of 17 to 20 with a particularly useful length being 0.25 inches. The slot width and depth preferably closely matches the diameter of the needle used.

In this embodiment, the needle 200 moves through the anti-buckling mechanism 800 as it is advanced into the bottle's cork. As the needle 200 moves, a small taper on the needle's hub 240 pushes the swing arms 820 outward allowing the needle 200 to pass. There is also an elastic band 830 which acts to return the swing arms 820 to the needle 200 after they have been moved aside by the needle hub 240 or the hub extenders 250. This elastic band 830 essentially acts as a return spring. The extended needle hubs 250, depicted here as white cones, guide the swing arms 820 around the needle hub 240 and its larger base at the upper piece 430 without catching any edge due to the force of the elastic band 830. Alternative embodiments of the anti-buckling mechanism might include a series of telescoping cylinders, a single sliding cylinder, a collapsible bellows that makes contact with the needle at the narrowest diameter of the bellows, or a stiff coiled spring making contact with the needle diameter at the spring's inner surface.

The bottle clamping mechanism 500 consists of two simple clamping arms 510 and a locking mechanism comprised of a screw 520 and nut 530 to secure the arms 510 at a fixed position. Each clamp arm swings about an axis 540. This clamping mechanism 500 also ensures that the cork is centered beneath the needle 200 and that the needle guide and cork retaining system rests atop the bottle cork or sealing means.

A combined needle guide and cork retaining system 480 is shown as a simple disk with a small hole equal to or greater in diameter than the needle diameter that passes through its center. When the clamping mechanism 500 is secured to the bottle 700, this component 480 preferably rests against the upper surface of the cork as depicted in FIG. 4E. As this component 480 is fixed in position relative to the clamping arms 510, it acts to secure the cork in position during pressurization of the bottle.

Figure 5A:
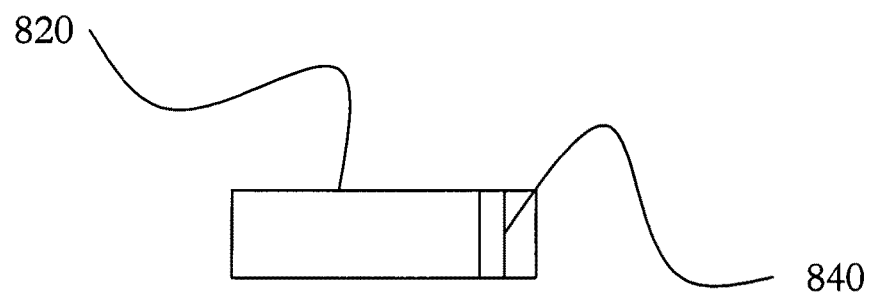
FIG. 5A and FIG. 5B depict detail of a preferred embodiment of the anti-buckling mechanism.
Figure 5B:
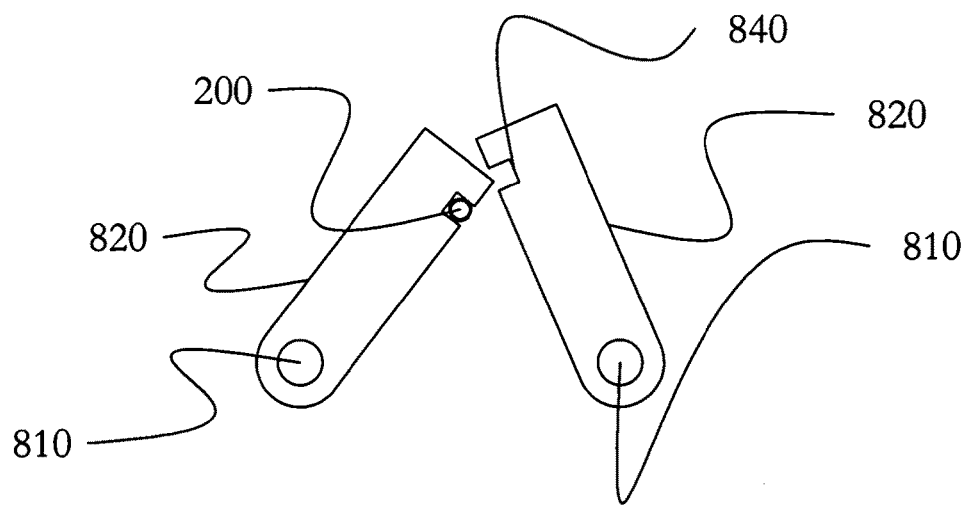

FIGS. 5A and 5B depict further detail of the anti-buckling mechanism 800 shown in FIG. 4. FIG. 5A shows a front view of a swing arm 820 with a slot 840 running along one end. FIG. 5B shows how this slot 840 fits over a length of the needle 200. In this figure, the swing arm 820 on the left constrains the needle 200 within slot 840. The swing arm 820 on right has swung away from the needle 200 about axis 810. When both swing arms 820 are engaging the needle 200, the needle is constrained such that the risk of needle buckling is reduced. By using multiple, alternating swing arms, the needle can be protected against buckling during advancement into and through a cork.

Alternative embodiments of the device might be integral to a bottle stand. In this embodiment there may be no need for a bottle clamp. The bottle could simply be slid along the bottle stand into the needle and anti-buckling mechanism. In this fashion the bottle would be on its side during insertion of the needle better guaranteeing contact between the needle tip and the fluid within the bottle. After use, the stand could be pivoted upward to allow the gas to vent.

In still further embodiments there might be more than one needle. Two needles would allow insertion of gas and extraction of fluid at the same time. One needle would be dedicated to allowing ingress of gas and would be connected to the pressurized gas source, while the other needle would allow the extraction of wine or fluid from within the bottle. In such an embodiment there may be no need for the trumpet valve described above, but simply for an on-off switch for the pressurized gas source. This could also be achieved with a two lumen needle wherein gas would travel down one lumen and wine would travel up the other. Each lumen could have a separate entrance and exit. These exits could be spaced from each other within the bottle to prevent circulation of gas.

Still further embodiments may employ a dilator instead of a needle. Such a dilator could be passed between the cork and the bottle wall into the wine, leaving no damage to the cork itself. Such a dilator could be cannulated and arcuately shaped to best match the outer diameter of the cork.

The bottle clamping mechanism employed in the above described embodiments comprises two clamping handles pivoting around axes secured to the bottom piece. These handles are lockable to the wine bottle through the use of a clamp bolt/screw and nut. Many alternative embodiments of a bottle clamp are possible. Alternatives to the bolt and nut lock include, but are not limited to a ratcheting lock, or a simple strap that can be slid down or wrapped around the swing arms, locks located at the axes of the swing arms, etc. The clamp handles could be replaced by a cylinder that fits over the wine bottle neck. Such a cylinder could have a split wall with a conically tapered outer surface. An outer ring could be slid along the conical surface to cause the inner diameter of the cylinder to decrease, clamping the cylinder about the bottle neck. A locking feature between the ring and the cylinder could be used to lock the cylinder to the bottle. This cylinder could be incorporated into the bottom piece.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of extracting fluid from within a container sealed by a cork comprising the steps of:
    inserting a hollow non-coring smooth exterior walled needle through said cork, wherein said smooth non-coring needle does not damage said cork and said cork remains capable of maintaining an air tight seal after removal of said needle;
    wherein said needle has an inlet at one end and outlet at an other end and wherein said needle is connected to a valve that is connected to a pressure regulated source of compressed non-reactive gas;
    tilting said container on its side such that the fluid contents of said container come in contact with at least one outlet of said needle;
    injecting pressurized gas regulated between 15 and 50 PSI into said container through said needle outlet causing an increase of pressure within said container to a level higher than the surrounding atmospheric pressure but limiting it between 15 and 50 PSI;
    allowing flow of said fluid to be driven by said pressure through at least one said needle outlet to a needle inlet outside of said container until a desired amount of fluid is extracted;
    returning said container to an upright position to allow contact between said needle outlet and excess gas from within said container, so that said excess gas can vent through said needle to said needle inlet outside of said container until a desired lower pressure is reached; and
    removing said needle from said cork;
    said extraction of fluid from a container sealed by a cork achieved without the removal of said septum, plug or cork and exposing the fluid to air.

2. A method of extracting fluid from within a container sealed by a cork comprising the steps of:
    inserting a single lumen smooth exterior walled non coring needle beyond said closure device and into the container, wherein said needle is operable to maintain the integrity of the cork to prevent unwanted gaseous or liquid ingress or egress after removal of said needle;
    injecting a pressurized non-reactive gas into said container through said hollow needle thereby causing an increase of pressure within said container to a level higher than the surrounding atmospheric pressure;
    allowing said fluid within said container to be forced out of said container by said pressure through said needle until a desired amount of fluid is extracted;
    regulating the delivery of the gas such that flow of the fluid is achieved while the volume of fluid in the container is decreased by increasing or maintaining the pressure in the container and limiting the pressure to prevent the expulsion or leakage around the cork; and
    removing said needle from said cork thereby allowing said cork to reseal;
    said extraction of fluid from a container is achieved without the removal of said cork and exposing the fluid to air.

3. The method in claim 2 further comprising the step of engaging said container proximal to said cork and restricting said cork from being expelled from said container.

4. The method in claim 1 further comprising the step of inserting the needle through a foil cover surrounding the cork and not removing said foil.

5. The method in claims 2 further comprising the step of inserting the needle through a foil cover surrounding the cork and not removing said foil.

6. The method in claim 1 further comprising the step of engaging said container proximal to said cork and restricting said cork from being expelled from said container.

* * * * *

UNITED STATES PATENT AND TRADEMARK OFFICE
CERTIFICATE OF CORRECTION

PATENT NO. : 7,712,637 B2
APPLICATION NO. : 11/010598
DATED : May 11, 2010
INVENTOR(S) : Gregory H. Lambrecht It is certified that error appears in the above-identified patent and that said Letters Patent is hereby corrected as shown below:

In the drawings, sheet 1, replace Figure 1 with:

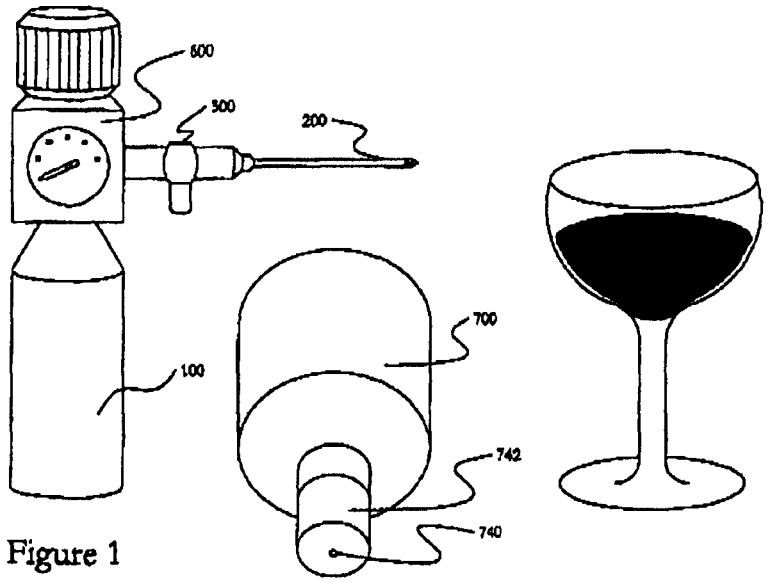

Figure 1

Col. 12 line 14, delete "septum, plug or";
Col. 12 line 19, delete "closure device" and replace with --cork--.

Signed and Sealed this

Twenty-seventh Day of July, 2010

David J. Kappos
*Director of the United States Patent and Trademark Office*